W. W. STEVENSON.
BURNER FOR GAS FURNACES.
APPLICATION FILED SEPT. 1, 1917.

1,298,817.

Patented Apr. 1, 1919.

WITNESSES:

INVENTOR
Wilbur W. Stevenson
BY
ATTORNEY

UNITED STATES PATENT OFFICE.

WILBUR W. STEVENSON, OF WILKINSBURG, PENNSYLVANIA, ASSIGNOR TO WESTINGHOUSE ELECTRIC & MANUFACTURING COMPANY, A CORPORATION OF PENNSYLVANIA.

BURNER FOR GAS-FURNACES.

1,298,817.     Specification of Letters Patent.     Patented Apr. 1, 1919.

Application filed September 1, 1917. Serial No. 189,338.

*To all whom it may concern:*

Be it known that I, WILBUR W. STEVENSON, a citizen of the United States, and a resident of Wilkinsburg, in the county of Allegheny and State of Pennsylvania, have invented a new and useful Improvement in Burners for Gas-Furnaces, of which the following is a specification.

My invention relates to burners for gas furnaces, particularly of the type that are used for welding or brazing together the end rings and conducting bars of the secondary members of induction motors and similar apparatus.

The object of my invention is to provide a burner which embodies means for obtaining a combustible mixture at a point closely adjacent to where it is ignited and which is adapted to project an intensely hot flame with considerable force.

Figure 1:
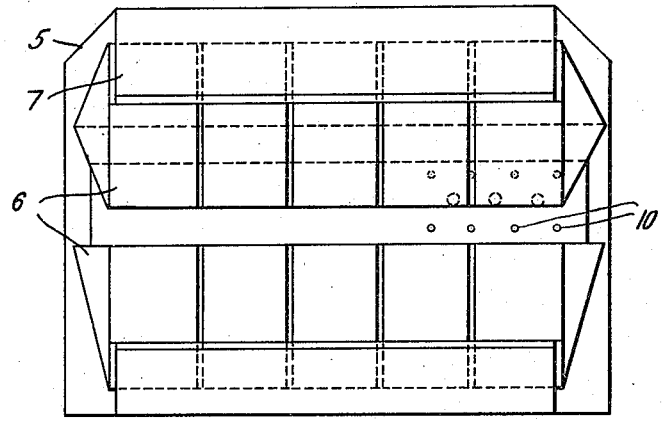
Figure 2:
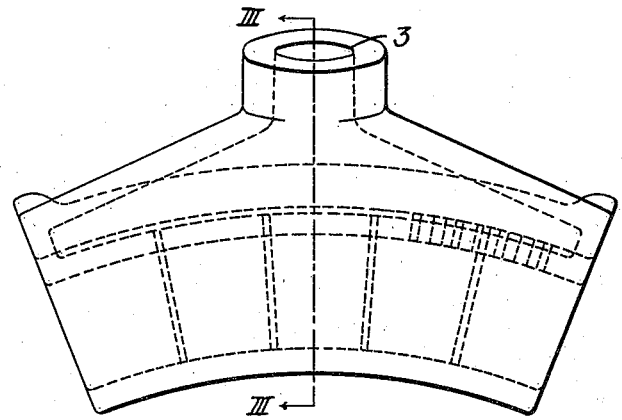
Figure 3:
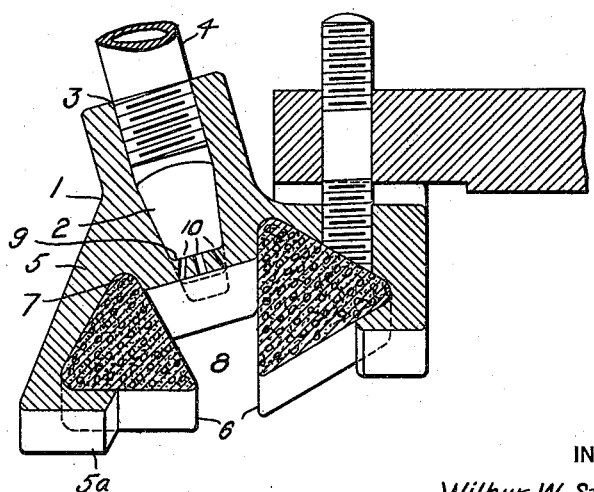

In accompanying drawings, Figure 1 is an end view of a burner constructed in accordance with my invention. Fig. 2 is a plan view of the burner shown in Fig. 1 and Fig. 3 is a sectional view along the line III—III of Fig. 2.

The burner comprises a hollow casting 1, preferably segmental in form, within which is formed a mixing chamber 2 that is provided with a threaded opening 3 for the reception of a supply pipe 4. The casting 1 comprises divergent jaw portions 5 that respectively project from the top and bottom walls of the chamber 2. Refractory members 6, preferably in the form of fire-bricks that are triangular in cross section, are retained in grooves 7 provided at the base of the jaws 5 by flanges 5$^a$ that are provided at the extremities of the said jaws. The members 6 may be readily inserted between the flanges and the grooves so that they may be easily replaced. The members 6 are spaced apart and are arranged to form a curved combustion chamber 8, radially different portions of which are of different widths, the narrowest portion of the chamber 8 being at the point most remote from the mixing chamber 2. The end wall 9 of the mixing chamber 2 is provided with a plurality of passages 10 of relatively small cross sectional area that connect the mixing chamber 2 to the combustion chamber 8.

From the foregoing, it is apparent that, when gas and air under pressure are admitted to the mixing chamber 2 through the pipe 4, a combustible mixture of the two will be formed because only a relatively small portion of the cubical contents of the chamber 2 will escape through the openings 10 at any given instant. Consequently, the gas and air will have a tendency to circulate around the chamber and form an intimate mixture. The combustible mixture will be ignited as it enters the combustion chamber 8 through the passages 10, and the flame will be directed and concentrated by the converging faces of the refractory members 6 so that a relatively narrow hot flame will be delivered by the burner with considerable force.

My burner is particularly adapted to be used in connection with the furnace shown and described in a copending application of Charles W. Starker, Serial No. 184,250, filed Aug. 3, 1917, and assigned to the Westinghouse Electric & Manufacturing Company. In this furnace, the burners are circumferentially arranged so that a substantially annular sheet of flame is directed against the outer periphery of the end ring that is being welded.

While I have shown my invention in its simplest and preferred form, it is not so limited but is susceptible of various modifications within the scope of the appended claims.

I claim as my invention:

1. A burner for a furnace comprising a curved metallic trough having diverging walls within which are removably located members of refractory material arranged to provide a passage therebetween, different portions of which are of different widths.

2. A burner for a furnace comprising a curved chamber member having divergent jaw portions and refractory members supported by said jaw portions and arranged to provide a passage therebetween, different portions of which are of different widths.

3. A burner for a furnace comprising a curved chamber member having divergent jaw portions provided with end flanges and refractory members located between the end flanges and the bases of said jaw portions.

4. A burner for a furnace comprising a curved chambered member having divergent jaw portions provided with end flanges and refractory members of triangular cross section located between the end flanges and the bases of said jaw portions and arranged to provide a passage therebetween, radially different portions of which are of different widths.

In testimony whereof, I have hereunto subscribed my name this 21st day of August, 1917.

WILBUR W. STEVENSON.

Copies of this patent may be obtained for five cents each, by addressing the "Commissioner of Patents, Washington, D. C."